United States Patent [19]

Hudson et al.

[11] Patent Number: 4,567,772
[45] Date of Patent: Feb. 4, 1986

[54] VIBRATION SHAKER/SLIP PLATE INTERFACE HARDWARE

[75] Inventors: Donald G. Hudson, St. Petersburg; Donald F. Keegan, Seminole, both of Fla.

[73] Assignee: Honeywell Inc., Minneapolis, Minn.

[21] Appl. No.: 718,035

[22] Filed: Mar. 29, 1985

[51] Int. Cl.⁴ .......................................... G01N 29/00
[52] U.S. Cl. ................................................. 73/663
[58] Field of Search ................................ 73/663, 662

[56] References Cited

U.S. PATENT DOCUMENTS

| | | | |
|---|---|---|---|
| 4,270,390 | 6/1981 | Kimball et al. | 73/663 |
| 4,440,026 | 4/1984 | Kimball | 73/663 |
| 4,489,612 | 12/1984 | Griggs | 73/663 |

Primary Examiner—Anthony V. Ciarlante
Attorney, Agent, or Firm—Albin Medved

[57] ABSTRACT

An improved interface in a vibration testing apparatus for attaching a slip plate, adapted for carrying the specimen to be tested, to a vibration generator, commonly referred to as a shaker machine. The interface comprises a plurality of jam nut assemblies designed to attach to the slip plate by threading into tapped holes in the edge of the plate and to the shaker machine via a specially designed bullnose.

4 Claims, 5 Drawing Figures

VIBRATION SHAKER/SLIP PLATE INTERFACE HARDWARE

BACKGROUND OF THE INVENTION

The present invention pertains to vibration testing apparatus. More specifically, it pertains to the interface mechanism for attaching a slip plate to a shaker machine.

In the prior art, a number of different methods are used for attaching slip plates to shaker machines. One such method comprises the welding of the slip plate to a bullnose, which in turn is attached to the shaker machine by bolts. This arrangement does not provide much misalignment tolerance since no dimensional adjustment is possible and results in long assembly time.

Another prior art approach for attaching a slip plate to a shaker machine is the use of an interface referred to as a driver bar. The slip plate is attached to the driver bar by bolts through holes generally normal to the surface of the slip plate. This arrangement results in high sheer forces exerted on the bolts during the vibration of the slip plate.

BRIEF SUMMARY OF INVENTION

The object of the present invention is to provide an improved interface for connection of a slip plate to a shaker machine. In particular, it is an object of the present invention to provide such interface in which the ease of assembly and disassembly is greatly improved by increasing tolerance for misalignment and providing for dimensional adjustment. Dynamic characteristics are improved and the efficiency of force transmissibility from the shaker machine to the slip plate are increased.

The interface hardware according to the present invention comprises a bullnose for attachment to the shaker machine and a plurality of jam nut assemblies for securing the slip plate to the bullnose. In spite of the many advantages which will be further described below, the interface mechanism according to the present invention is less expensive than the other options currently available on the market. The jam nut assembly consists of off-the-shelf items and easily machined parts. Slip plate modifications consist only of a number of tapped holes in the edge of the plate. The bullnose is cast and requires little additional machining. As a result, the total procurement and manufacturing time is relatively short.

Other advantages, which will become more clear upon reading the description of the preferred embodiment, include: improved dynamic characteristics due to low Q at resonance design of the bullnose; arrangement of elements in tension/compression rather than shear relationship to enhance force transmissibility and dynamic response; rapid assembly and disassembly requiring a minimum translation of the slip plate; tolerance for dimensional misalignment in roll, side to side, and in the axis normal to the plane of the slip plate; long life with easy replacement of elements at low cost; and the lowest weight possible without sacrificing performance.

The above objects and advantages of the present invention will become more clear upon examination of the following description of the preferred embodiment and the concluding claims.

DESCRIPTION OF THE PREFERRED EMBODIMENT

Figure 1:
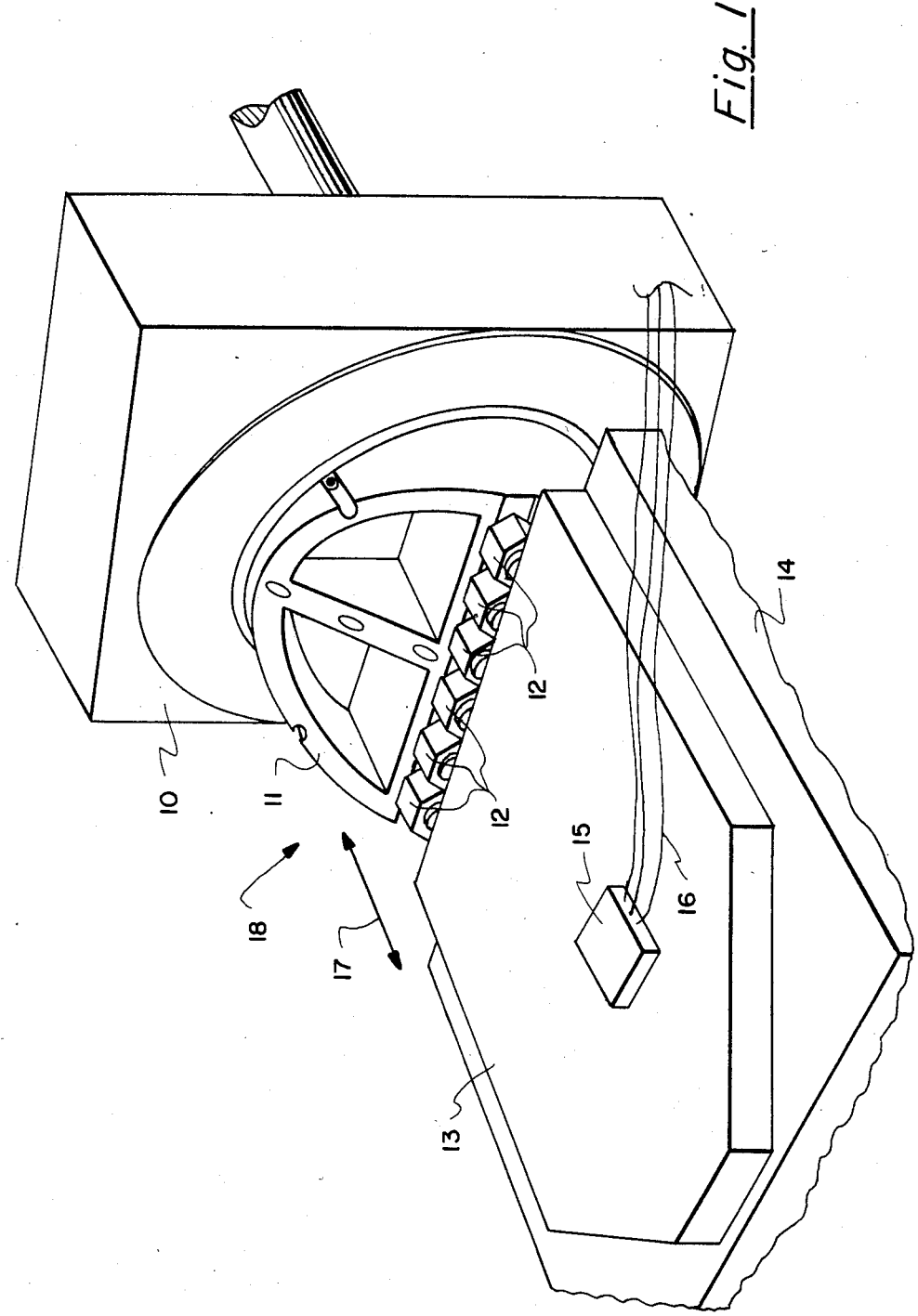
FIG. 1 illustrates an interface mechanism according to the present invention engaging a slip plate to a shaker machine.

Referring now to the embodiment of FIG. 1, interface hardware 18, including a bullnose 11 and a plurality of jam nut assemblies 12, is shown connecting a slip plate 13 to a shaker machine 10. Slip plate 13 is shown resting on a bearing table 14 and is adapted for relative motion with respect to bearing table 14. A test specimen 15 is shown positioned on slip plate 13. Wires 16 are provided for electrically connecting test specimen 15 with appropriate indicating and recording equipment which is not shown and is not part of the present invention.

Figure 2:
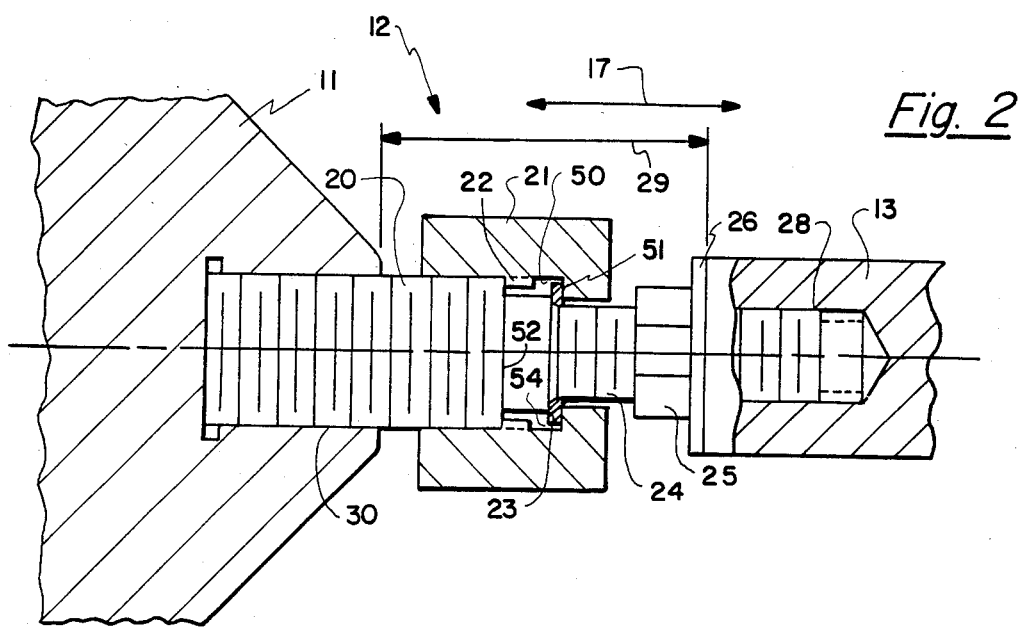
FIG. 2 illustrates a jam nut assembly for use in the apparatus illustrated in FIG. 1.

The particular features of each jam nut assembly 12 are more clearly shown in FIG. 2. Each jam nut assembly 12 is comprised of a compression element 21 having an axial bore, the first end of which has an internal thread 22 and the second end of which is of a relatively smaller diameter. A washer 23 is positioned within compression element 21 against an edge 51 produced at the junction of the first and second ends of the axial bore. The outside diameter of washer 23 is somewhat smaller than the internal diameter of compression element 21 at points 50 and 54 to provide some tolerance, but sufficiently larger than the diameter of the second end of the axial bore to be securely held in compression element 21 by edge 51.

A hex bolt 24 having a head larger than the internal diameter of washer 23 and a shaft of a diameter no larger than the internal diameter of washer 23, is positioned within compression element 21 with its shaft inserted through washer 51 and extending out of the compression element through the smaller diameter end of the axial bore. The shaft of hex bolt 24 extending out of compression element 21 is shown threaded into a tapped hole 28 in slip plate 13. A washer 26 is shown positioned on the shaft of hex bolt 24, adjacent to slip plate 13. A jam nut 25, on the shaft of hex bolt 24 next to washer 26, is used to lock the position of hex bolt 24 relative to slip plate 13.

A threaded stud 20 is threaded into the first end of the axial bore in compression element 21. The other end of stud 20 is threaded into correspondingly threaded hole 30 in bullnose 11, bottoming out against the inner most end of hole 30.

Compression element 21 is threaded firmly onto stud 20 so that it produces a solid contact between the end of stud 20 internal to compression element 21 and face 52 of the head of hex nut 24. The motion transmitted by bullnose 11 from the shaker machine to slip plate 13 is along the direction of arrow 17 shown in FIGS. 1 and 2. Arrow 29 in FIG. 2 represents the gage distance between bullnose 11 and slip plate 13. Gage distance 29 can be adjusted by the position of jam nut 25 and the distance to which hex bolt 23 is threaded into hole 28 in slip plate 13. As will be noted from FIG. 2, all of the elements in jam nut assembly 12 are either in compression or tension during the motion of the assembly along the direction of arrow 17.

Figure 3:
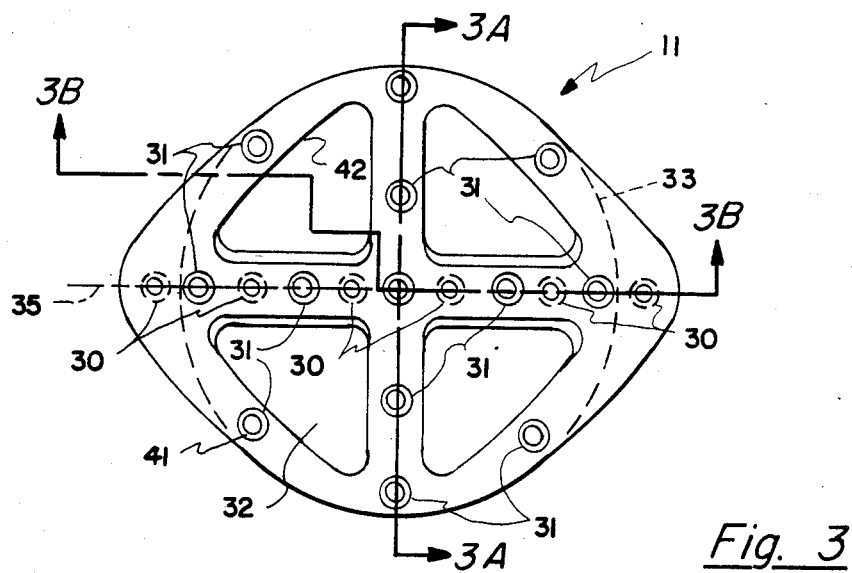
FIG. 3 is a view of a bullnose forming part of the apparatus illustrated in FIG. 1.
Figure 3A:
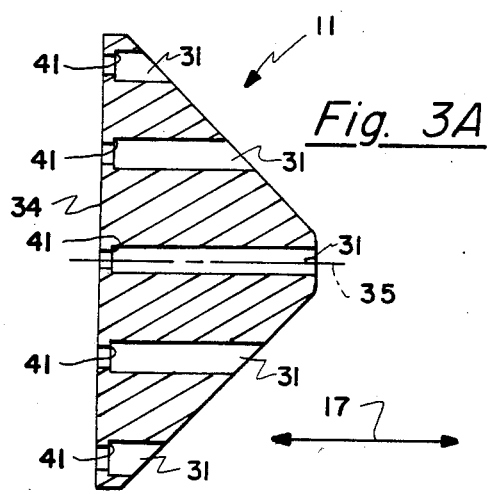
FIG. 3A is a first cross-section view of the bullnose illustrated in FIG. 3.

FIG. 3 shows in greater detail the features of bullnose 11. A plurality of holes 31 are shown along the circumference of a circle and along a pair of mutually or orthogonal diameters. Holes 31 pass entirely through bullnose 11 and are provided for attaching bullnose 11 to shaker machine 10 by means of bolts. Holes 31 are somewhat reduced in diameter at the end closest to surface 34, at which bullnose 11 comes into contact with shaker machine 10, resulting in a ledge 41 being formed in each hole 31. Bullnose 11 is attached to shaker machine 10 by a plurality of bolts inserted into holes 31, the heads of the bolts coming to rest against ledge 41. Surface 34 of bullnose 11, which comes in contact with shaker machine 10, is of a circular cross section, as shown by the dotted line in FIG. 3.

Figure 3B:
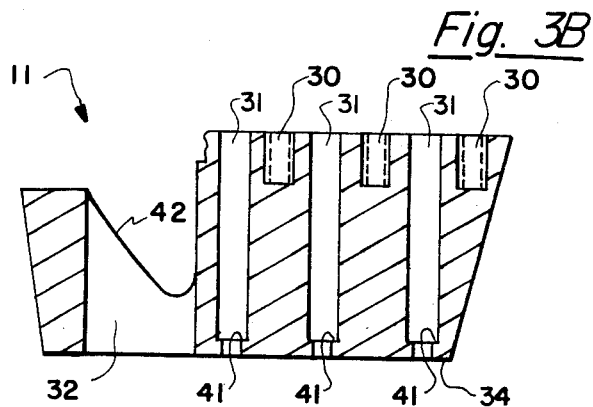
FIG. 3B is a second cross-section view of the bullnose illustrated in FIG. 3.

Bullnose 11 further has a plurality of threaded holes 30 arranged along center line 35. Six such holes are shown in the embodiment shown in FIG. 3. Holes 30 are bottomed out in bullnose 11 in the manner shown in FIGS. 2 and 3B and are threaded to receive threaded stud 20. The number of holes 30 in bullnose 11 depends on the number of jam nut assemblies 12, which are used to attach slip plate 13 to bullnose 11, as shown in FIG. 1. There are also a corresponding number of threaded holes 28 tapped into the edge of slip plate 13 to receive the threaded shafts of hex bolts 24 of the respective jam nut assemblies.

The jam nut assembly 12 has a large diameter to length ratio for high natural frequency. Bullnose 11 is short with thick members. Because assembly member diameter, thickness, and height dimensions vary continuously, the bullnose does not have a sharp resonance. The low resonance Q's increases the shaker capability to vibrate large loads at higher "G" levels. Bullnose 11 is designed to transmit force from the high strength outer diameter of the shaker head to slip plate 13. Force is transmitted through the ribs to bullnose 11 at approximately 45 degrees. The bullnose outer ring is essentially an extension of the shaker head. The force transmissibility and dynamic response are enhanced by the fact that all elements of interface hardware 18 are in tension/compression relationship rather than shear. No pressurized components are used which might require pumps and are more troublesome in terms of plumbing, leaks, repairs, etc.

The interface hardware according to the present invention was designed to be of the lowest weight possible without sacrificing performance. Material has been removed from bullhead 11 as shown by openings 32 in FIGS. 3 and 3B. The reduction in weight has been accomplished without sacrificing transmissibility and dynamic characteristics. The interface hardware 18, according to the present invention, is further characterized by the ease and quickness of assembly and disassembly. Assembly and disassembly requires a minimum amount of translation of the slip plate. When a linear bearing table is being used, diassembly of the slip plate from the bearings is not required. Dimensional misalignment is allowable in roll, side to side, and in the direction normal to the surface of slip plate 13. Tolerance for substantial dimensional misalignment during assembly is the result of design considerations at the interface of stud 20 and hex bolt 24 and the interface of washer 23 and edge 51 of compression element 21. The adjustment of gage distance 29 is possible during the assembly by adjustment of jam nut 25 and hex bolt 24.

Bullnose 11 is attached to the shaker machine 10 by bolts inserted through holes 31 while it is easily accessible in vertical position. Studs 20 of jam nut assemblies 12 are threaded into bullnose 11 until the studs bottom in the bullnose. Hex bolts 24 are assembled with the respective jam nut 25, washer 23, and compression element 21, and threaded into tap hole 28 at the edge of slip plate 13. Hex bolts 24 are threaded into slip plate 13 to a distance which achieves a gage length 29 between bullnose 11 and slip plate 13. The assembly process is continued by tightening of compression element 21 until the adjoining ends of stud 20 and hex bolt 24 are in firm contact at face 52. This process self adjusts gage distance 29 by backing out hex bolt 24. The assembly process is completed by tightening nut 25. Disassembly and subsequent assemblies are accomplished simply by only rotating compression element 21.

The preceding specification described the preferred embodiment of the present invention. Other embodiments will become obvious to those skilled in the art without departing from the scope of the invention which is limited only by the following claims:

1. An interface apparatus for attaching a slip plate to a shaker machine, said apparatus comprising:
  a bullnose adapted for attachment to said shaker machine; and
  a plurality of jam nut assemblies for attaching an edge of said slip plate to said bullnose, each of said jam nut assemblies including,
  a threaded stud mounted on and protruding from said bullnose in the direction toward said edge of said slip plate,
  a bolt threaded partially into a threaded hole in said edge of said slip plate, said bolt having a head at the end protruding from said slip plate; and
  a compression element adapted to engage the outer end of said threaded stud and the head of said bolt for holding the end of said threaded stud firmly against the head of said bolt.

2. Apparatus according to claim 1, wherein:
  said threaded stud is of a diameter larger than the diameter of the head of said bolt;
  said compression element has an axial bore a first end of which is internally threaded to receive said threaded stud, and a second end of which is of a lesser diameter than said first end, but greater than the diameter of said bolt; and
  said bolt is positioned within said compression element such that the shaft of said bolt projects from said compression element through the second end of said bore, while the head of the bolt is held in the compression element by an edge formed at the junction of the first and second ends of the axial bore.

3. Apparatus according to claim 2, wherein a washer is positioned on said bolt within said compression element between the head of said bolt and said the edge.

4. Apparatus according to claim 3, wherein the relative dimensions of said bolt, said washer and said first and second ends of the axial bore in said compression element are such as to allow a predetermined tolerance for misalignment during the attachment of the slip plate to the shaker machine.

* * * * *